March 3, 1964 R. R. FINK 3,123,662
STRAIN RELIEF COLLET
Filed July 26, 1962
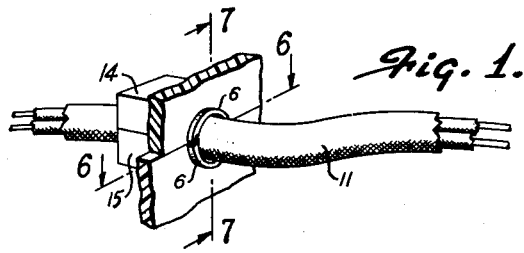
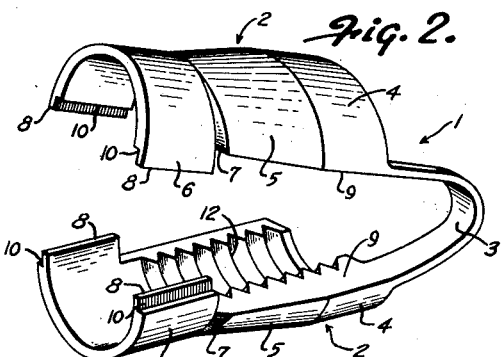
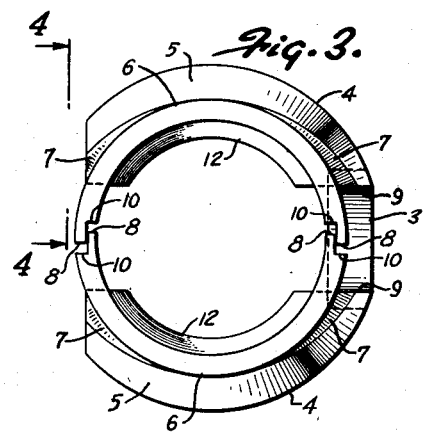
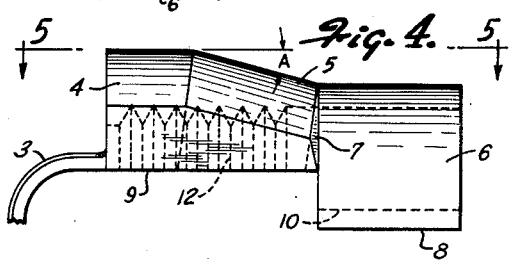
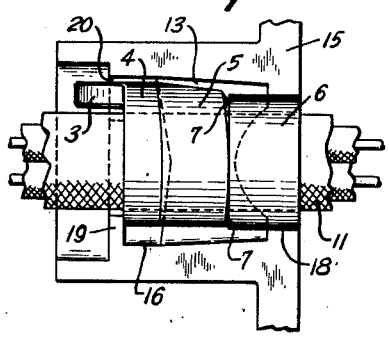
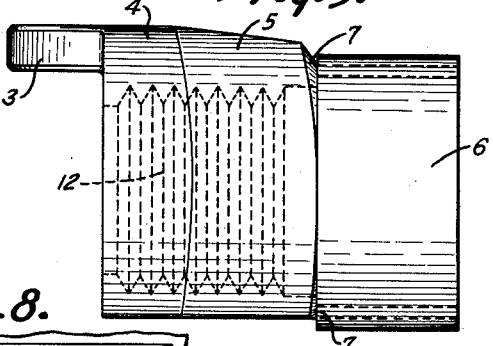
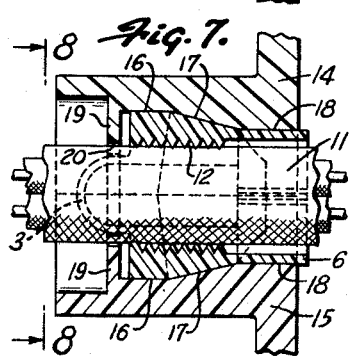
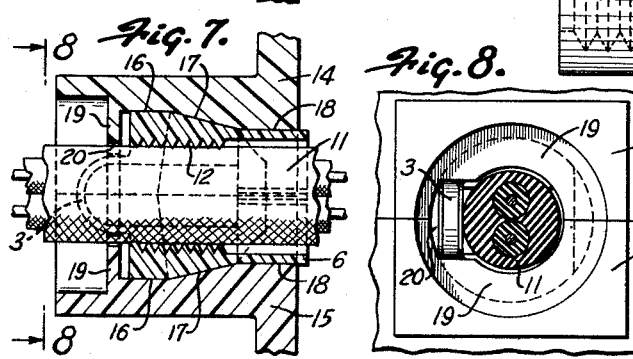
INVENTOR.
RICHARD R. FINK
BY
Andrus & Starke
ATTORNEYS United States Patent Office 3,123,662
Patented Mar. 3, 1964

3,123,662
STRAIN RELIEF COLLET
Richard R. Fink, Waukesha, Wis., assignor to Heyman Manufacturing Company, Kenilworth, N.J.
Filed July 26, 1962, Ser. No. 212,566
11 Claims. (Cl. 174—65)

This invention relates to a strain relief collet and more particularly to a strain relief collet to be used for attaching an electrical power line within an opening in the casing of an electrical device.

Strain relief bushings or collets are used to attach electrical power lines or cords within an opening in the wall of a junction box or other electrical apparatus. The collet or bushing, which is made of insulating material, firmly engages the cord and prevents relative movement between the cord and the junction box, thereby eliminating any strain on the electrical connection of the cord within the box. The bushing also serves to prevent abrasion of the cord within the opening in the wall of the junction box or other electrical device.

The normal strain relief bushing acts to kink or deform the cord and hold the cord by frictional contact. A considerable amount of the electrical cord presently used has an outer plastic covering, and because of the cold flow characteristics of plastic, the kinking provides a permanent deformation of the cord, which is often undesirable.

The present invention is directed to a strain relief collet which tightly holds the cord within an opening in the wall of an electrical device without deforming the cord. The collet is effective against push and pull forces as well as rotational force or torque applied to the cord.

More specifically, the collet comprises a pair of longitudinally split halves, with each half including three longitudinally aligned sections. The halves are connected by a flexible strap, and the electrical cord is adapted to be clamped between the halves.

The inner and middle sections of each half are portions of a cylinder and are provided with the same diameter. However, the middle cylindrical section is tilted at an angle of 13° to 18° with respect to the inner cylindrical section. The inner surface of both the inner and middle cylindrical sections are provided with a series of serrations or teeth which are adapted to engage the electrical cord.

The outer cylindrical section of each collet half is provided with a smaller diameter than the inner or middle sections, and serves as a bushing to prevent abrasion of the cord within the opening in the casing wall.

The collet is adapted to be located within a cavity molded, machined or otherwise formed within the casing of the electrical apparatus. The cavity is provided with cylindrical surfaces complementing the cylindrical surfaces of the collet. In addition, the cavity is formed with an annular end wall which is located adjacent the end of the inner section of the collet and serves as a stop to prevent inward movement of the collet with respect to the casing. The end wall in the cavity is provided with a recess which receives the strap on the collet and the strap, being located within the recess, prevents full rotation of the collet and cord within the cavity.

An outward pull or force applied to the cord will cause the tilted middle cylindrical section of the collet to move along the corresponding tilted cylindrical surface of the cavity to provide a wedging action which forces the serrations or teeth into firm engagement with the outer surface of the cord.

The collet assembly of the invention will tightly secure the cord within the casing wall and will effectively resist push and pull forces applied to the cord as well as torque applied to the cord. Moreover, the collet acts to secure the cord without deforming or kinking the cord as do conventional strain relief bushings.

The collet can be secured to the cord and attached to the casing wall without the use of special tools. In addition, the use of the collet of the invention provides a definite cost advantage in certain applications, particularly where space is at a premium and smaller mounting holes are required.

Other objects and advantages will appear in the course of the following description.

The drawings illustrate the best mode presently contemplated of carrying out the invention.

In the drawings:

FIG. 1 is a perspective view showing the collet assembly as applied to a casing of an electrical device;

FIG. 2 is a perspective view of the strain relief collet of the invention;

FIG. 3 is a front end view of the collet;

FIG. 4 is a side elevation taken along line 4—4 of FIG. 3;

FIG. 5 is a top elevation taken along line 5—5 of FIG. 4;

FIG. 6 is a horizontal section taken along line 6—6 of FIG. 1 and showing the collet in plan, and in a non-strain relieving position against the back wall;

FIG. 7 is a sectional view taken along line 7—7 of FIG. 1 and showing the collet in a strain relieving position; and FIG. 8 is a sectional view taken along line 8—8 of FIG. 7.

The drawings illustrate a strain relief collet 1 formed of an insulating material, such as plastic or the like. The collet 1 is composed of two generally symmetrical halves 2 which are connected together by a flexible strap 3 which is formed integral with the halves.

Each of the collet halves 2 is composed of an inner cylindrical section 4, a middle cylindrical section 5 and an outer cylindrical section 6. The inner cylindrical section 4 and the middle cylindrical section 5 are portions of cylinders having the same diameter. However, the middle section 5 is disposed at an angle A of less than 20°, and preferably in the range of 13° to 18°, with respect to the inner section 4, as best shown in FIG. 4. The outer cylindrical section 6 is provided with a smaller diameter than the middle section 5 and because of the difference in diameter, a shoulder 7 is provided at the junction between the sections 5 and 6.

As best shown in FIGS. 3 and 4, the longitudinal edges 8 of the outer section 6 extend circumferentially beyond the corresponding longitudinal edges 9 of the sections 4 and 5. In addition, the edges 8 are provided with a step 10 or shoulder and when the collet is assembled around the electrical cord 11, the steps 10 of the sections 6 will be in a complementary or locking relation to provide a generally continuous cylindrical section. However, the longitudinal edges 9 of the sections 4 and 5 of each collet half 2 will be spaced apart in the assembled position.

The inner surface of each of the sections 4 and 5 is provided with a series of transversely extending serrations or teeth 12 having sharpened edges which are adapted to engage the outer surface of the cord and hold the same.

As best shown in FIG. 1, the collet 1 is located in a cavity 13 formed by the wall sections 14 and 15 of an electrical apparatus or the like. The collet is adapted to firmly secure the electrical cord 11 within an opening in the wall sections.

Each wall section 14 and 15 is provided with a series of cylindrical surfaces which correspond to the surfaces 4, 5 and 6 of the collet, and which define the cavity 13. For example, each wall section is provided with an inner cylindrical surface 16, corresponding to surface 4, which is connected to a central cylindrical surface 17, corresponding to surface 5, formed with the same diameter as the surface 16, but disposed at an angle of 13° to 18° with respect to the cylindrical surface 16. In addition, each of the wall sections 14 and 15 is provided with a cylindrical surface 18, corresponding to surface 6 of the collet, which is formed with a lesser diameter than the surfaces 16 and 17. When the wall sections 14 and 15 are attached together, the surfaces 16 and 18 of each wall section form continuous cylindrical surfaces.

In addition, each wall section 14 and 15 is provided with a radially extending end wall 19. As best shown in FIGS. 7 and 8, the end walls 19 complement each other but do not extend completely around the cavity 13. Instead, one end of each wall 19 is spaced from the corresponding end of the other end wall to provide a gap or recess 20 which receives the strap 3 of the collet.

As best shown in FIG. 7, the outer sections 6 of the collet halves 2 have a somewhat greater length than the corresponding cavity surfaces 18 so that the outer end of the sections 6 will project outwardly beyond the wall sections 14 and 15 and serve as a bushing to prevent abrasion of the cord 11 on the wall sections.

To assemble the collet 1 within the wall sections 14 and 15, the collet halves 2 are initially applied to the electrical cord 11 and brought together so that the stepped edges 8 of the sections 6 are in substantial interlocking engagement. The collet is then located in the portion of the cavity 13 formed by one of the wall sections and the other wall section is then attached to the first wall section to position the collet within the cavity.

While the drawings show the joint or split between wall sections 14 and 15 extending generally parallel to the longitudinal split between the collet halves 2, it is contemplated that the joint between the wall sections 14 and 15 may extend at an angle of 90° to the longitudinal split between the collet halves 2. In this latter case, both collet halves would be initially inserted within the cavity formed by one of the wall sections, and the wall section would thereby prevent the collet halves from springing apart as the second wall section is attached to the first wall section.

In this initial position, the serrations or teeth 12 within the inner cylindrical surface 4 and 5 are in engagement with the cord 11 and hold the same and the end of the inner section 4 is located in engagement with the end walls 19 of the wall sections.

When an outward pull is applied to the cord 11, in the righthand direction, as shown in FIGS. 6 and 7, the tilted cylindrical section 5 rides downwardly along the corresponding cylindrical section 17 of the cavity 13 to provide a wedging type of action which forces the serrations beneath the section 5 into firm engagement with the cord so that the serrations along the entire length of the collet are firmly engaged with the cord. The engagement of the serrations 12 with the cord 11 prevents the cord from being drawn outwardly and serves to secure the cord to the wall sections. Thus, any pull or force applied to the cord will be transmitted to the wall sections 14 and 15 and will not be transmitted to the electrical connections within the electrical device or junction box.

In addition, the strap 3 being located within the notch or recess 20 in the end walls prevents free rotation of the cord and collet within the cavity. The end walls 19 also prevent the collet 1 and cord 11 from being pushed inwardly of the wall sections of the electrical device. Thus, the collet assembly resists push and pull movement of the cord in an axial direction and also resists rotational movement of the cord.

As surfaces 5 and 17 are portions of cylinders, a continual closing action is provided so that the collet can be used with a variety of cord diameters. With the cylindrical surfaces, pressure is obtained along the entire length of the surfaces. If conical surfaces were to be employed in place of cylindrical surfaces, the pressure applied to the cord would be applied merely along a circumferential line rather than along the entire length of the surfaces. Moreover, if the surfaces were conical, the surfaces would lock against each other and conceivably the cord could be pulled out between the locked cones if the conical surfaces were not designed perfectly to hold the cord. However, with the cylindrical surfaces there is no locking between the surfaces so that a continued pull will continue to move the surface 5 with respect to the surface 17 to provide a tight lock for the cord. It is possible, however, to form surface 5 with a conical contour rather than a cylindrical contour as long as the surface 17 is cylindrical. However, the collet structure will not operate effectively if both the surfaces 5 and 17 are conical, nor will it operate if the cavity surface 17 is conical and the collet surface 5 is cylindrical.

The angularity between the surface 5 and surface 4 is important to the invention. As previously mentioned, this angle A should be in the range of 13° to 18° with 15° being preferred. There are two frictional considerations involved in the holding action applied by the collet. One is the friction between the collet and the cavity and the second is the friction between the teeth and the cord. It is necessary that the friction between the collet and the cord is greater than the friction between the collet and the cavity wall in order that the collet can move within the cavity and provide the wedging action to force the collet halves inwardly. If the frictional resistance between the collet and the cavity is greater than the friction between the teeth and the cord, the cord will slip out of the collet.

As angle A is increased, the frictional resistance between the collet and the cavity is correspondingly increased so that when using rubber or plastic covered cord, it has been found that when angle A is increaesd beyond 20°, using rubber or plastic covered cord, the frictional resistance between the collet and the cavity exceeds that between the collet and the cord and the collet will not effectively clamp the cord. As the angle A is descreased, the length of the wedging surfaces 5 and 17 must also be increased to provide the proper wedging action. As angle A is decreased below 13° the length of the collet will generally be increased outside of practical usage. Therefore, it is preferred that the angularity be within the range of 13° to 18°.

While the cavity 13 is shown molded in the wall sections of the electrical apparatus, it is contemplated that the cavity can be molded separately into a block which could be attached to the electrical apparatus, junction box or other article.

The collet assembly of the invention can be readily assembled to the casing without the use of special tools and it will not deform or kink the electrical cord. The collet firmly holds the cord to the casing and prevents the cord from being pushed and pulled and also prevents free rotation of the cord within the casing wall.

The invention is particularly adaptable to applications where space is at a premium and smaller mounting holes are required.

Various modes of carrying out the invention are contemplated as being within the scope of the following claims particularly pointing out and distinctly claiming the subject matter which is regarded as the invention.

I claim:

1. A strain relief collet comprising, a pair of longitudinally split halves adapted to receive and hold an electrical cord therebetween, each half including a first outer surface with said first surface being a portion of a cylinder and each half including a second outer surface with said second outer surface being a portion of a cylinder of the same diameter as said first surface and joining said first surface along a circumferentially extending line, said second surface being disposed inwardly toward the axis of the collet at an angle of less than 20° with respect to said first surface, and means disposed on the inner surface of at least one of said collet halves for engaging the outer surface of the cord when the halves are forced together.

2. A strain relief collet comprising, a pair of longitudinally split halves adapted to receive and hold an electrical cord therebetween, each half including a first outer surface with said first surface being a portion of a cylinder and each half including a second outer surface with said second outer surface being a portion of a cylinder of the same diameter as said first surface and joining said first surface along a circumferentially extending line, said second surface being tilted inwardly toward the axis of the collet at an angle of less than 20° with respect to said first surface, and each half including a third outer surface with said third surface being a portion of a cylinder and having a smaller diameter than said first surface and joining said second surface along a circumferentially extending line, and a series of projections disposed on the inner surface of each collet half for engaging the outer surface of the cord when the halves are forced together.

3. The structure of claim 2 and including a flexible strap joining the halves together.

4. A strain relief collet comprising, a pair of longitudinally split halves adapted to receive and hold an electrical cord therebetween, each half including a first outer surface with said first surface being a portion of a cylinder and each half including a second outer surface with said second outer surface being a portion of a cylinder of the same diameter as said first surface and joining said first surface along a circumferentially extending line, said second surface being tilted inwardly toward the axis of the collet at an angle of less than 20° with respect to said first surface, and each half including a third outer surface with said third surface being a portion of a cylinder and having a smaller diameter than said first surface and joining said second surface along a circumferentially extending line, the longitudinal edges of said third surfaces extending circumferentialy beyond the longitudinal edges of said first and second surfaces, and a series of circumferentially extending teeth disposed on the inner surface of each half and disposed in alignment with said first and second surfaces, said teeth serving to engage the outer surface of the cord when the halves are forced together.

5. A strain relief assembly for securing a cord to an article, comprising a housing having an opening to receive the cord, said housing including a first internal cylindrical surface and a second internal cylindrical surface having the same diameter as said first cylindrical surface, said second cylindrical surface joining said first surface along a circumferentially extending line and being disposed inwardly toward the axis of the opening at an angle of less than 20° with respect to said first surface, and a collet located within the opening in said housing and comprising a pair of longitudinally split halves adapted to receive the cord therebetween, each collet half including a first outer surface complementing said first cylindrical surface of said housing and said first outer surface being a portion of a cylinder, each half also including a second outer surface complementing said second cylindrical surface of the housing and being disposed inwardly toward the axis of the collet at an angle of less than 20° with respect to said first outer surface of the collet half, and the inner surface of each collet half having a series of teeth for engaging the outer surface of the cord, said second outer surface of the collet adapted to ride longitudinally along said second cylindrical surface of the housing as the cord is moved longitudinally to provide a wedging action and force the collet halves into tight engagement with the cord.

6. A strain relief assembly comprising, a housing having an opening to receive an electrical cord and formed of two longitudinally split halves, each housing half including a first inner cylindrical surface and a second inner cylindrical surface of the same diameter as said first surface and joining said first surface along a circumferentially extending line, said second inner surface being disposed inwardly toward the axis of the opening at an angle of less than 20° with respect to said first surface, and a collet disposed within the opening in the housing and formed of a pair of longitudinally split halves with the cord adapted to be received between said halves, each collet half including a first outer surface being a portion of a cylinder and complementing the first cylindrical surface of said housing, each collet half including a second outer surface with said second outer surface being a portion of a cylinder of the same diameter as said first outer surface and complementing said second inner surface of the housing, said second outer surface of each collet half being disposed inwardly toward the axis of the collet at said angle, and means disposed on the inner surface of at least one of said collet halves for engaging the outer surface of the cord when the collet is moved longitudinally with respect to the housing.

7. The structure of claim 6, and including means associated with the collet and engageable with the housing for preventing rotation of the collet within the housing.

8. A strain relief assembly for securing a cord to an article, comprising a housing having an opening to receive the cord, said housing including a first internal cylindrical surface and a second internal cylindrical surface having the same diameter as said first cylindrical surface, said second cylindrical surface joining one end of said first surface along a circumferentially extending line and being disposed inwardly toward the axis of the opening at an angle of 13° to 18° with respect to said first surface, said housing also including an end wall extending radially inward adjacent the other end of said first cylindrical surface, said end wall having an opening to receive the cord and having a recess extending partially around the circumferential extent of said end wall, and a collet located within the opening in said housing and comprising a pair of longitudinally split halves joined by a flexible strap and adapted to receive the cord therebetween, each collet half including a first outer surface complementing said first cylindrical surface of said housing and said first outer surface being a portion of a cylinder, each half also including a second outer surface complementing said second cylindrical surface of the housing and being disposed inwardly toward the axis of the collet at an angle of 13° to 18° with respect to said first outer surface of the collet half, the inner end of said collet adapted to engage the end wall of said housing to prevent inward displacement of said collet and said strap being received within the recess in said end wall to prevent rotation of the collet within the housing, and the inner surface of each collet half having a series of teeth for engaging the outer surface of the cord, said second outer surface of the collet adapted to ride longitudinally along said second cylindrical surface of the housing as the cord is moved longitudinally to provide a wedging action and force the collet halves into tight engagement with the cord.

9. A strain relief collet comprising, a pair of longitudinally split members adapted to receive and hold an electrical cord therebetween, each member including a first outer surface with said first surface being a portion of a cylinder and each member including a second outer surface with said second outer surface being a portion of a cylinder of the same diameter as said first surface and extending inwardly from one end of said first surface toward the axis of said collet at an angle of less than 20° with respect to said first surface, and each member including a third outer surface with said third surface being a portion of a cylinder and having a smaller diameter than said first surface and joined to an end of said second surface, the longitudinal side edges of the third surface of one of said members being disposed to engage the corresponding longitudinal side edges of the third surface of the other of said members to thereby encircle the cord, and the longitudinal side edges of the first and second surfaces of each member being spaced out of contact with the corresponding longitudinal side edges of the first and second surfaces of the other member, and cord engaging means located on the inner surface of at least one of said members for engaging the cord and preventing axial movement of the cord with respect to the collet.

10. A strain relief collet comprising, a pair of longitudinally split members, each member including a first outer surface with said first outer surface being a portion of a cylinder and extending through an arc less than 180°, each member also including a second outer surface with said second outer surface being a portion of a cylinder of the same diameter as said first named cylinder and extending through an arc less than 180°, said second surface joining said first surface and being disposed at an angle of less than 20° with respect to said first surface, said collet members adapted to receive and hold an electrical cord therebetween and the longitudinal side edges of said members being spaced apart when the members are in the cord-holding position, cord engaging means disposed on the inner surface of at least one of said members for preventing movement of the cord with respect to the members, and flexible means for connecting the members together.

11. In a strain relief assembly, a housing having an opening to receive an electrical cord, said housing including a first internal cylindrical surface bordering said opening, and said housing also including a pair of opposed second internal surfaces bordering said opening, said second surfaces joining said first cylindrical surface along generally circumferential extending lines and said second surfaces being portions of cylinders having the same radius as said first cylindrical surface, and said second surfaces being disposed inwardly toward the axis of said opening at an angle of less than 20° with respect to said axis.

References Cited in the file of this patent

UNITED STATES PATENTS

| | | |
|---|---|---|
| 885,836 | Bullock | Apr. 28, 1908 |
| 1,129,782 | Bissell et al. | Feb. 23, 1915 |
| 1,832,138 | Pounder | Nov. 17, 1931 |
| 2,930,840 | Klumpp | Mar. 29, 1960 |
| 2,952,730 | Simonds | Sept. 13, 1960 |
| 3,056,852 | Sachs | Oct. 2, 1962 |